United States Patent
Shim et al.

(10) Patent No.: US 8,935,712 B2
(45) Date of Patent: Jan. 13, 2015

(54) BROADCAST RECEIVER, BROADCASTING PROGRAM SELECTION METHOD AND STORAGE MEDIUM THEREOF

(75) Inventors: Bo-kyung Shim, Seoul (KR); Hee-jeong Bae, Suwon-si (KR); Jong-chan Park, Gyeonggi-do (KR); Jin-ho Yim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 774 days.

(21) Appl. No.: 13/018,969

(22) Filed: Feb. 1, 2011

(65) Prior Publication Data

US 2011/0197213 A1 Aug. 11, 2011

(30) Foreign Application Priority Data

Feb. 5, 2010 (KR) ........................ 10-2010-0011192

(51) Int. Cl.
*H04H 60/33* (2008.01)
*H04H 60/32* (2008.01)
*H04N 5/445* (2011.01)
*G06F 3/00* (2006.01)
*H04H 60/46* (2008.01)
*H04N 21/25* (2011.01)
*H04N 21/466* (2011.01)
*H04N 21/482* (2011.01)
*H04N 21/84* (2011.01)

(52) U.S. Cl.
CPC ............... *H04H 60/33* (2013.01); *H04H 60/46* (2013.01); *H04N 21/252* (2013.01); *H04N 21/4667* (2013.01); *H04N 21/4668* (2013.01); *H04N 21/482* (2013.01); *H04N 21/84* (2013.01)
USPC ......... 725/9; 725/14; 725/39; 725/40; 725/46

(58) Field of Classification Search
CPC .......... H04N 21/4532; H04N 21/4668; H04N 21/4826; H04N 21/44222; H04N 21/44204; H04N 21/4821
USPC ...................... 725/9, 14, 39, 40, 46
See application file for complete search history.

(56) References Cited

U.S. PATENT DOCUMENTS

| 7,577,645 | B2 | 8/2009 | Yamamoto et al. | |
| 2005/0251825 | A1* | 11/2005 | Fukuda et al. | 725/44 |
| 2006/0026642 | A1* | 2/2006 | Schaffer et al. | 725/46 |
| 2006/0047678 | A1* | 3/2006 | Miyazaki et al. | 707/102 |
| 2007/0277218 | A1* | 11/2007 | Borden | 725/135 |
| 2008/0082999 | A1* | 4/2008 | Hamada et al. | 725/46 |

(Continued)

FOREIGN PATENT DOCUMENTS

| JP | 2004-194108 | 7/2004 |
| JP | 2007-011901 | 1/2007 |
| KR | 1020090123344 | 12/2009 |

*Primary Examiner* — Gigi L Dubasky
(74) *Attorney, Agent, or Firm* — The Farrell Law Firm, P.C.

(57) ABSTRACT

A broadcast receiver including a storage unit for storing viewing history data of a user; a display unit for displaying broadcasting program recommendation information including at least one piece of broadcasting program path information; and a processor for collecting the viewing history data by using received Electronic Program Guide (EPG) data, storing the viewing history data in the storage unit, generating the at least one piece of broadcasting program path information based on the viewing history data, displaying the at least one piece of broadcasting program path information on the display unit, and selecting a broadcasting program based on the at least one piece of broadcasting program path information.

18 Claims, 8 Drawing Sheets

(56) References Cited

U.S. PATENT DOCUMENTS

2008/0295132 A1* 11/2008 Icho et al. .................. 725/46
2009/0019488 A1* 1/2009 Ruiz-Velasco et al. ......... 725/43
2010/0333142 A1* 12/2010 Busse et al. .................... 725/47

* cited by examiner

BROADCAST RECEIVER, BROADCASTING PROGRAM SELECTION METHOD AND STORAGE MEDIUM THEREOF

PRIORITY

This application claims priority under 35 U.S.C. §119(a) to Korean Patent Application No. 10-2010-0011192, filed on Feb. 5, 2010, in the Korean Intellectual Property Office, the entire disclosure of which is incorporated herein by reference.

BACKGROUND OF THE INVENTION

1. Field of the Invention

The present invention generally relates to broadcasting program selection, and, more particularly, to a broadcast receiver having a function of selecting a broadcasting program based on a user's viewing history, a broadcasting program selection method, and a storage medium thereof.

2. Description of the Related Art

Digital broadcasting has rapidly developed and become widespread. Thus, the number of broadcasting programs and the number of broadcasting channels for a user to choose from has sharply increased. It has, therefore, become difficult for the user to select a desired broadcasting program.

In order to solve this problem, a broadcasting station provides a summarized table regarding a schedule of broadcasting programs via Electronic Program Guide (EPG) data, or provides personalized EPG data. However, in the case in which the number of broadcasting programs and the number of broadcasting channels sharply increase, it is not possible to display all EPG data on a screen, so a user must check received EPG data one-by-one so as to select a desired broadcasting program. Thus, it may take a long time for the user to select a desired broadcasting program.

SUMMARY OF THE INVENTION

The present invention provides a broadcast receiver facilitating broadcasting program selection by using broadcasting program recommendation information based on a user's viewing history, a broadcasting program selection method, and a storage medium thereof.

According to an aspect of the present invention, there is provided a broadcast receiver, including a storage unit for storing viewing history data of a user; a display unit for displaying broadcasting program recommendation information, including at least one piece of broadcasting program path information; and a processor for collecting the viewing history data by using received Electronic Program Guide (EPG) data, storing the viewing history data in the storage unit, generating the at least one piece of broadcasting program path information based on the viewing history data, displaying the at least one piece of broadcasting program path information on the display unit, and selecting a broadcasting program based on the at least one piece of broadcasting program path information.

The broadcasting receiver may further include a network interface unit for transmitting and receiving data via a network, the processor may generate a plurality of pieces of broadcasting program path information based on viewing history data collected by the network interface unit and the viewing history data of the user, and the viewing history data collected by the network interface unit may be based on the viewing history data of the user.

According to another aspect of the present invention, there is provided a broadcasting program selection method including collecting a viewing history data of a user by using received Electronic Program Guide (EPG) data; generating at least one piece of broadcasting program path information based on the viewing history data; displaying the at least one piece of broadcasting program path information as broadcasting program recommendation information; and selecting a broadcasting program based on the at least one piece of broadcasting program path information.

The step of selecting the broadcasting program may further include collecting viewing history data via a network, the step of generating the at least one piece of broadcasting program path information may further include generating a plurality of pieces of broadcasting program path information based on viewing history data collected via the network and the viewing history data of the user, and the viewing history data collected via the network may be based on the viewing history data of the user.

According to another aspect of the present invention, there is provided a non-transitory computer readable recording medium having recorded thereon a computer program for executing the broadcasting program selection method.

BRIEF DESCRIPTION OF THE DRAWINGS

The above and other features and advantages of the present invention will become more apparent by describing in detail embodiments thereof with reference to the attached drawings in which.

DETAILED DESCRIPTION OF EMBODIMENTS OF THE PRESENT INVENTION

Hereinafter, embodiments of the present invention will be described with reference to the accompanying drawings.

Figure 1:
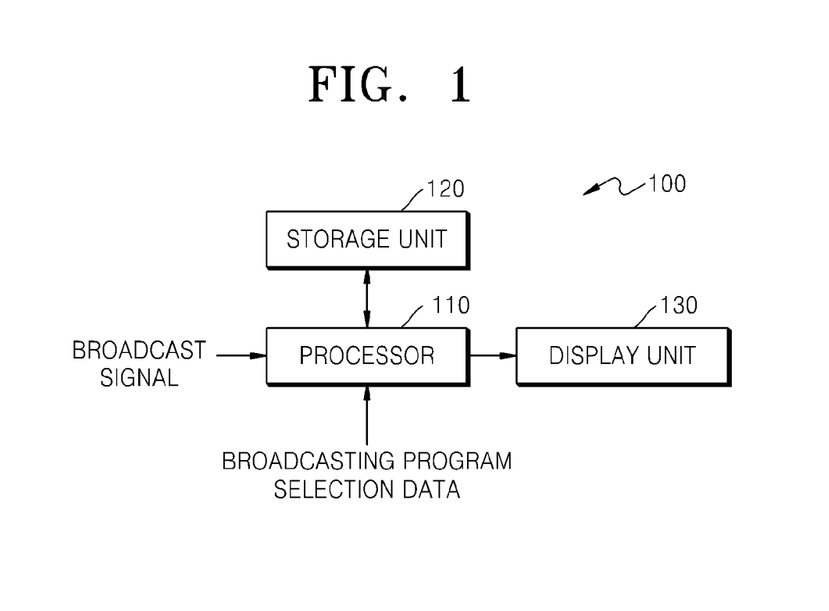
FIG. 1 is a block diagram illustrating a broadcast receiver according to an embodiment of the present invention.

FIG. 1 is a block diagram illustrating a broadcast receiver 100, according to an embodiment of the present invention.

The broadcast receiver 100 may be a television (TV) but is not limited thereto. The broadcast receiver 100 may be a device having a function of receiving a broadcast signal, a device having a function of recording a broadcast signal, or a device having a function of receiving and recording a broadcast signal.

Referring to FIG. 1, the broadcast receiver 100 includes a processor 110, a storage unit 120, and a display unit 130.

The processor 110 controls all functions of the broadcast receiver 100. In particular, the processor 110 may collect viewing history data related to a user, may store the viewing history data in the storage unit 120, may generate at least one piece of broadcasting program path information based on the viewing history data stored in the storage unit 120, may display the broadcasting program path information on the display unit 130 as broadcasting program recommendation information, and may select a desired broadcasting program based on the displayed broadcasting program path information.

The broadcasting program path information that is displayed on the display unit 130 is related to a broadcasting program to be watched and/or recorded. Further, in the case in which the broadcast receiver 100 is a device capable of receiving and recording a broadcast signal, the processor 110 may collect at least one of the viewing history data including at least one record history data. The at least one of the viewing history data including the at least one record history data may be stored in the storage unit 120.

For convenience of description, it is assumed that the viewing history data is collected in one or more embodiments of the present invention, but the viewing history data in one or more embodiments may be construed as including both the viewing history data and the record history data, only the record history data, or only the viewing history data.

Figure 2:
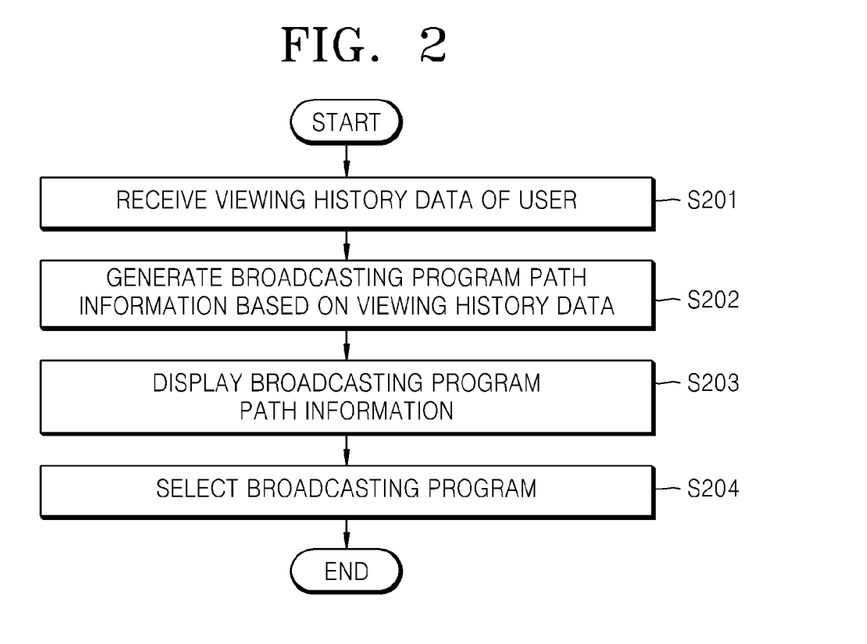
FIG. 2 is a flowchart illustrating a broadcasting program selection method performed by the broadcast receiver, according to an embodiment of the present invention.

The processor 110 may operate in a manner as shown in FIG. 2. FIG. 2 is a flowchart illustrating a broadcasting program selection method performed by the broadcast receiver 100, according to an embodiment of the present invention.

Referring to FIG. 2, the processor 110 collects viewing history data of a user in step S201. When a desired broadcasting program is selected, the processor 110 may collect the viewing history data of the user by using an Electronic Program Guide (EPG) data of the selected broadcasting program. Thus, the viewing history data of the user may include data for each broadcasting program included in EPG data.

For example, the viewing history data may include the EPG data such as channel information, genre information, a program title, a viewing start time, a viewing end time, date information, a day of the week and the like. The EPG data may be included in a broadcast signal received by the broadcast receiver 100. The viewing start time and the viewing end time may be set according to time information included in the EPG data, and an actual viewing start time and an actual viewing end time by the user. The viewing history data of the user may further include the number of viewing counts and total viewing time periods. The number of viewing counts and the total viewing time periods are aggregated by the processor 110 according to information stored in the storage unit 120.

When the viewing history data is collected, the desired broadcasting program may be selected based on broadcasting program selection data. The broadcasting program selection data may be input by the user or may be generated by the processor 110 according to automatic reservation data to be described later. The broadcasting program selection data input by the user may be channel data unrelated to data displayed on the display unit 130, or may be channel data based on data displayed on the display unit 130.

The processor 110 may collect the viewing history data of the user for a predetermined time period. For example, the processor 110 may collect the viewing history data of the user by a week, month, quarter, or multiple years. The predetermined time period may also be set by the user.

Moreover, the processor 110 may collect the viewing history data by each user who uses the broadcast receiver 100. That is, the processor 110 may collect the viewing history data based on IDentifications (IDs) allocated to a plurality of users. In the case in which user A and user B use the broadcast receiver 100 via user IDs allocated to them, respectively, the processor 110 may collect viewing history data based on each of the user IDs, and may store the viewing history data in the storage unit 120. Accordingly, a plurality of pieces of viewing history data classified according to user IDs may be stored in the storage unit 120.

In step S202, the processor 110 generates at least one piece of broadcasting program path information based on collected viewing history data. That is, the processor 110 analyzes the collected viewing history data, and determines a preferred broadcasting program for each of dates, a day of the week, time slots, and genres according to the number of viewing counts and a total viewing time periods. The processor 110 generates broadcasting program path information based on a broadcasting channel, a broadcasting time, and a broadcasting title of the determined preferred broadcasting program. In the case in which a plurality of pieces of viewing history data of a plurality of users are stored in the storage unit 120, the processor 110 generates broadcasting program path information for each of the users. As described above, the generated broadcasting program path information is related to a broadcasting program to be watched and/or recorded.

Figure 3:
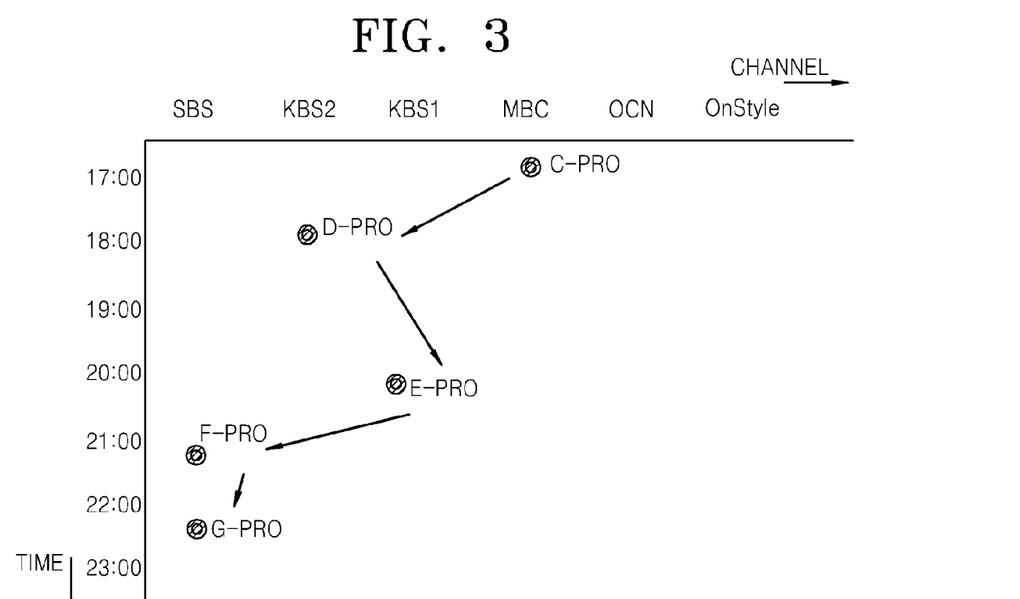
FIG. 3 illustrates an example of displayed broadcasting program path information based on the viewing history data of a user.

In step S203, the processor 110 displays the generated broadcasting program path information on the display unit 130. The broadcasting program path information may be displayed on the display unit 130, as shown in FIG. 3. FIG. 3 illustrates an example of displayed broadcasting program path information based on viewing history data of a user.

Referring to FIG. 3, as can be seen, at 17:00, i.e., 5 p.m., the user watches a broadcasting program having a title of C-PRO which is broadcast by MBC; the user may watch a broadcasting program having a title of D-PRO which will be broadcast at 18:00 by KBS2; the user may watch a broadcasting program having a title of E-PRO which will be broadcast at 20:00 by KBS1; the user may watch a broadcasting program having a title of F-PRO which will be broadcast at 21:00 by SBS; and the user may watch a broadcasting program having a title of G-PRO which will be broadcast at 22:30 by SBS. For convenience of description, the displayed broadcasting program path information of FIG. 3 indicates path information regarding watchable broadcasting programs, but the displayed broadcasting program path information of FIG. 3 may indicate path information regarding at least one watchable broadcasting program and recordable broadcasting programs.

The processor 110 may perform step S201 whenever a program that is being watched is changed, and may perform steps S202 and S203 at a regular time interval or whenever a channel of the broadcast receiver 100 is changed. The flowchart of FIG. 2 may be changed to satisfy the aforementioned situations. For example, between S201 and S202, an step may be added to check whether the regular time interval has elapsed or whether the channel has changed. The regular time interval may be set by the user but may be set as default in the broadcast receiver 100 or may be determined according to collection of viewing history data.

When the broadcasting program selection data is received based on the broadcasting program path information displayed on the display unit 130, the processor 110 selects a broadcasting program to be watched and/or recorded, according to the broadcasting program selection data received in step S204.

In the case in which the received broadcasting program selection data is automatic reservation data regarding the broadcasting program path information, the processor 110 sequentially selects broadcasting programs to be watched after a broadcasting program currently being watched according to a path shown in FIG. 3, regardless of user's involvement. Accordingly, if the user just inputs automatic reservation data, it is not necessary to perform channel selection by using a remote-controller or to perform a broadcasting program searching step based on EPG data but it is possible to continuously watch and/or record a preferred broadcasting program on a corresponding date.

Figure 4:
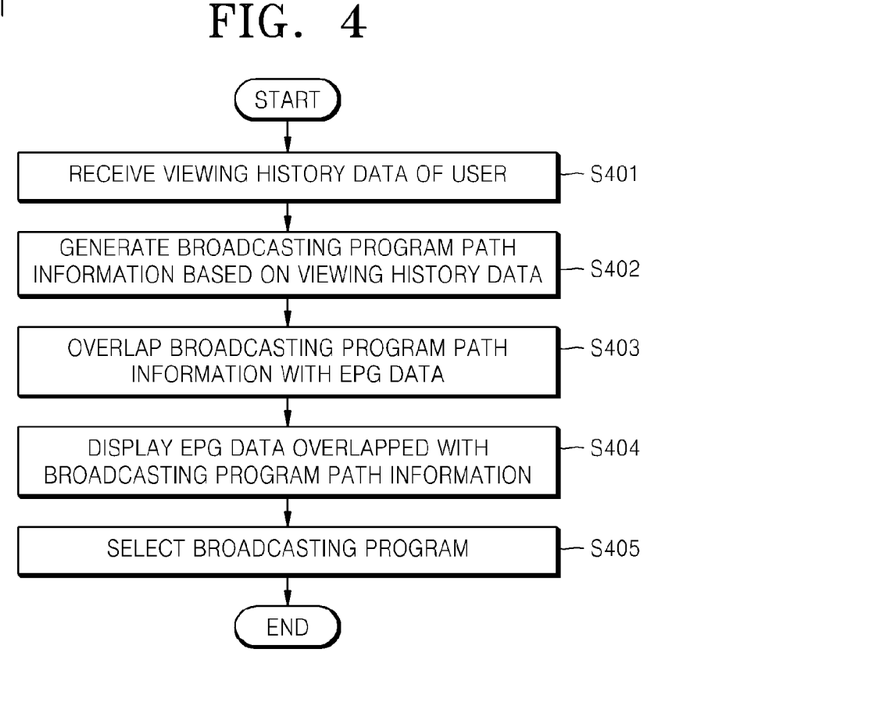
FIG. 4 is a flowchart illustrating a broadcasting program selection method performed by the broadcast receiver, according to another embodiment of the present invention.

The processor 110 of FIG. 1 may operate in a manner as shown in FIG. 4. FIG. 4 is a flowchart illustrating a broadcasting program selection method performed by the broadcast receiver 100, according to another embodiment of the present invention.

Steps S401 and S402 of the flowchart of FIG. 4 are the same as steps S201 and S202 of the flowchart of FIG. 2, and, thus, detailed descriptions thereof will be omitted here.

In step S403, the processor 110 overlaps generated broadcasting program path information with received EPG data. The overlapping step may be performed by using the broadcasting program path information and a program title, channel information, time slot information for a broadcasting program, or the like included in the EPG data. Thus, in step S404, as illustrated in FIG. 5, the EPG data overlapped with the broadcasting program path information is displayed on the display unit 130.

Figure 5:
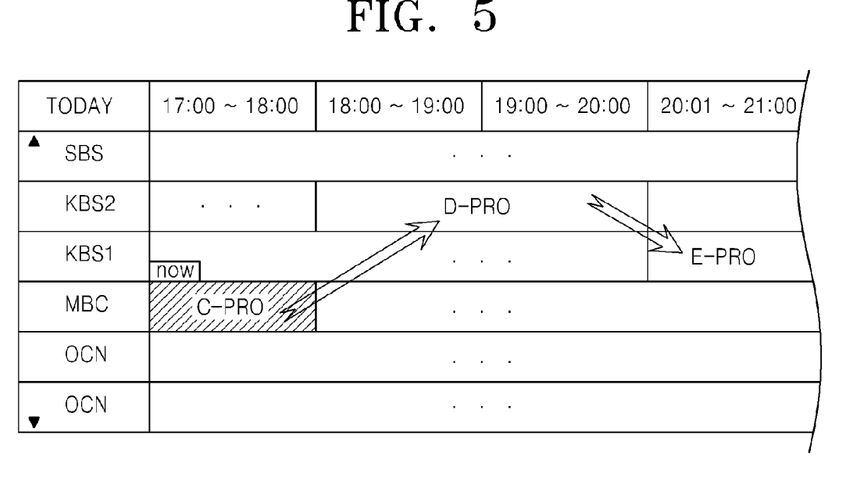
FIG. 5 illustrates an example of a screen on which Electronic Program Guide (EPG) data overlapped with the broadcasting program path information is displayed.

FIG. 5 illustrates an example of a screen on which the EPG data overlapped with the broadcasting program path information is displayed. In FIG. 5, a term "now" means that a broadcasting program having a title of "C-PRO" is being watched. Referring back to FIG. 4, in step S405, the processor 110 selects a broadcasting program according to input data based on the broadcasting program path information overlapped with the EPG data.

The storage unit 120 may store viewing history data of at least one user and broadcasting program path information according to automatic reservation data.

The display unit 130 may display the broadcasting program path information shown in FIG. 3 or 5 and may display a received broadcast signal, according to the flowchart of FIG. 2 or 4.

Figure 6:
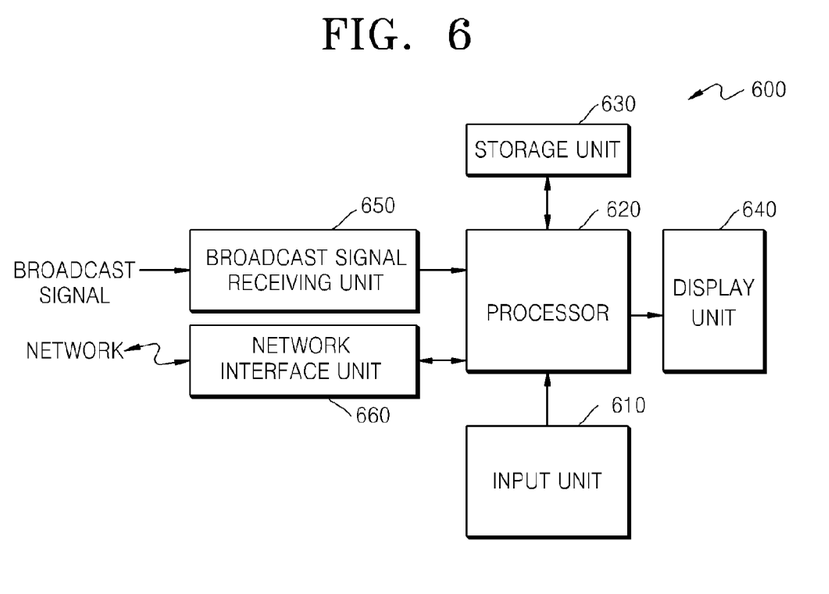
FIG. 6 is a block diagram illustrating a broadcast receiver according to another embodiment of the present invention.

FIG. 6 is a block diagram illustrating a broadcast receiver 600 according to another embodiment of the present invention. The broadcast receiver 600 may be a TV available for network connection but is not limited thereto. That is, the broadcast receiver 600 may be a device available for network connection and having a function of receiving a broadcast signal, a device available for network connection and having a function of recording a broadcasting signal, or a device available for network connection and having a function of receiving and recording a broadcast signal.

Referring to FIG. 6, the broadcast receiver 600 includes an input unit 610, a processor 620, a storage unit 630, a display unit 640, a broadcast signal receiving unit 650, and a network interface unit 660.

The input unit 610 may input various data including broadcasting program selection information for controlling functions of the broadcast receiver 600. The input unit 610 may be formed of a remote controller and a remote control signal receiver but is not limited thereto. For example, the input unit 610 may be a touch panel.

The processor 620 controls all functions of the broadcast receiver 600, and includes functions of the processor 110 of FIG. 1 and functions related to network connection. Hereinafter, descriptions regarding the aforementioned functions of the processor 110 of FIG. 1 will be omitted. However, functions of the processor 620 related to network connection will be described.

When a user's viewing history data is collected for a predetermined time period, the processor 620 collects viewing history data of at least one group determined by the viewing history data of the user or viewing history data according to a program rating, which is collected by the network interface unit 660, generates a plurality of pieces of broadcasting program path information based on the viewing history data of the user and the viewing history data collected by the network interface unit 660, and displays the broadcasting program path information on the display unit 640; and selects a broadcasting program according to the plurality of pieces of broadcasting program path information.

Figure 7:
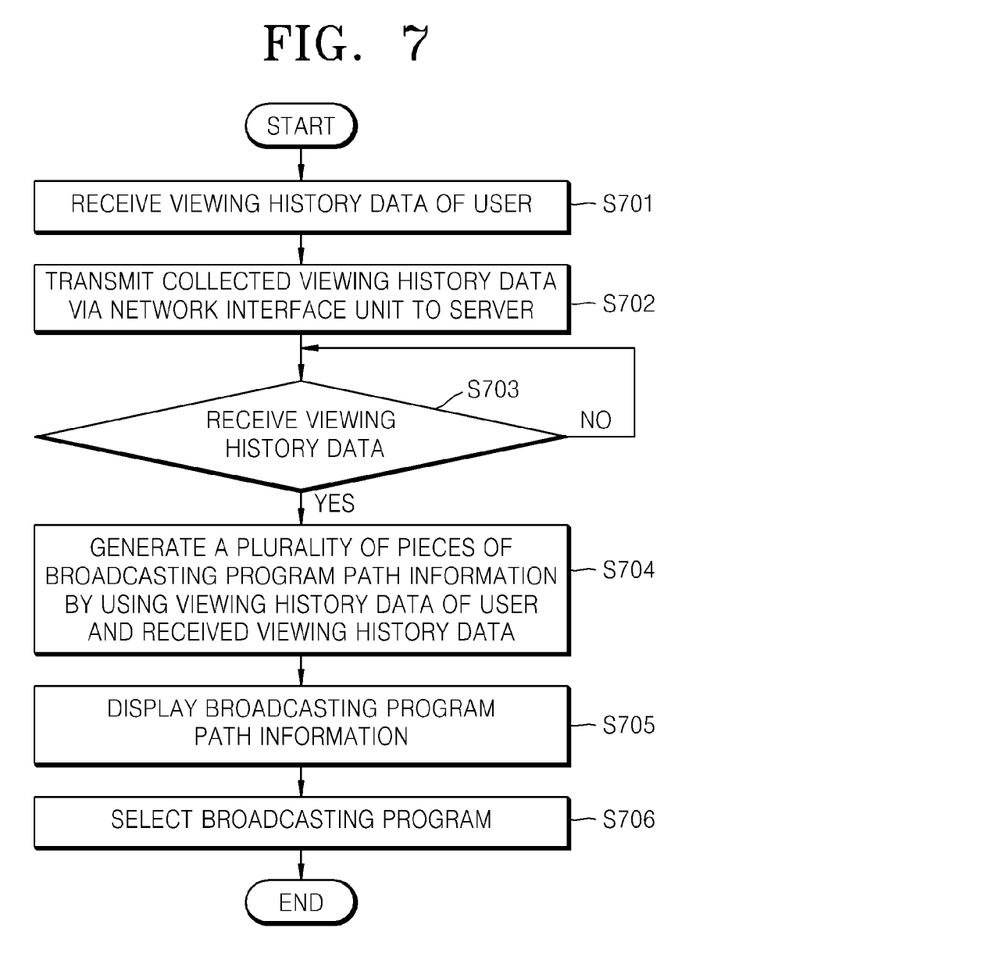
FIG. 7 is a flowchart illustrating a broadcasting program selection method performed by the broadcast receiver, according to another embodiment of the present invention.

That is, the processor 620 may operate in a manner shown in FIG. 7. FIG. 7 is a flowchart illustrating a broadcasting program selection method performed by the broadcast receiver 600, according to another embodiment of the present invention.

In step S701 of FIG. 7, the processor 620 collects viewing history data of a user in a manner described in step S201 of FIG. 2 by using EPG data received from the broadcast signal receiving unit 650, and stores the viewing history data of the user in the storage unit 630.

In step S702, the processor 620 transmits the viewing history data stored in the storage unit 630 to a viewing history data managing server (not shown) via the network interface unit 660. Accordingly, in step S703, when viewing history data is received, the processor 620 generates a plurality of pieces of broadcasting program path information by using the viewing history data stored in the storage unit 630 and the received viewing history data in step S704.

As described above, the viewing history data received in step S703 may include at least one of the viewing history data of at least one group determined by the viewing history data of the user, and the viewing history data according to the program rating.

The at least one group determined by the viewing history data of the user is a group of people having a similar broadcasting program preferences as the user. That is, the group includes people having similar viewing preferences to the viewing preferences of the user, which is determined according to a result of analyzing the viewing history data of the user. Thus, the viewing history data of the group may be referred to as viewing history data based on collective intelligence. Accordingly, the user may easily recognize viewing histories of other people having similar viewing preferences.

The viewing history data according to the program rating is obtained by searching for a broadcasting program having the highest rating based on a watching time slot included in the viewing history data of the user. For example, if the viewing history data of the user includes information regarding a broadcasting program titled "A-PRO" broadcast at 17:00-18:00 every Monday by KBS1, the viewing history data according to the program rating includes information regarding a broadcasting program having the highest rating from among broadcasting programs broadcast at 17:00-18:00 every Monday. If the broadcasting program titled "A-PRO" has the highest rating, the viewing history data according to the program rating includes information regarding the broadcasting program titled "A-PRO." However, if the broadcasting program titled "A-PRO" does not have the highest rating, the viewing history data according to the program rating includes information regarding another broadcasting program.

Figure 8:
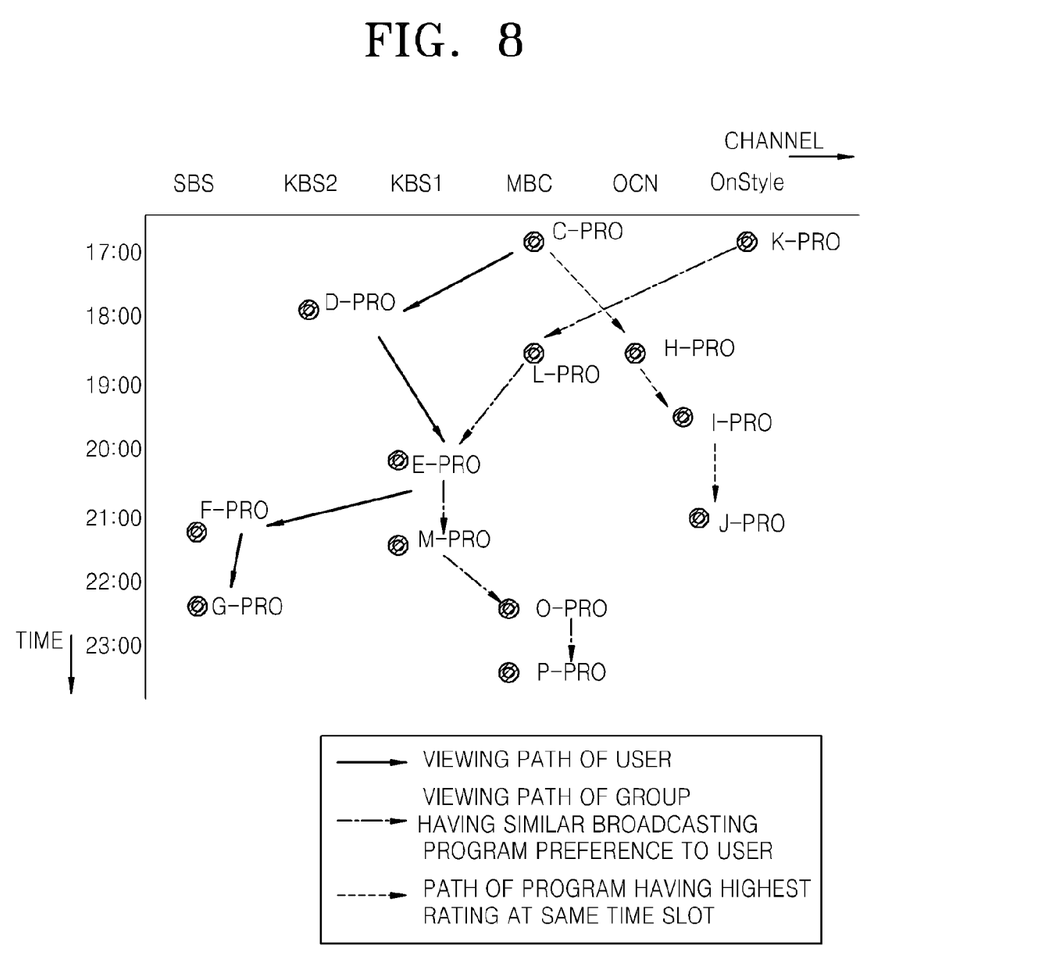
FIG. 8 illustrates an example in which a plurality of pieces of broadcasting program path information of FIG. 7 are displayed.

In step S705, the processor 620 displays the plurality of pieces of broadcasting program path information. That is, as illustrated in FIG. 8, the plurality of pieces of broadcasting program path information may be displayed on the display unit 640. FIG. 8 illustrates an example in which a plurality of pieces of broadcasting program path information are displayed, which are based on viewing history data of a user, viewing history data of a group having a similar broadcasting program preference to the user, and viewing history data according to a program rating.

As illustrated in FIG. 8, when the plurality of pieces of broadcasting program path information are displayed, the processor 620 may display different shapes or bold lines for broadcasting program paths, respectively. Also, the processor 620 may display program titles together with rating value information based on ratings of broadcasting programs on the broadcasting program paths. The rating value information based on ratings may be provided from a server (not shown) via the network interface unit 660.

As illustrated in FIG. 8, when the processor 620 displays the plurality of pieces of broadcasting program path information, the processor 620 generates and displays a plurality of pieces of broadcasting program path information with respect to a program that is being currently watched by the user.

In step S706, when broadcasting program selection data is received based on the displayed plurality of pieces of broadcasting program path information, the processor 620 selects a broadcasting program according to the received broadcasting program selection data.

Figure 9:
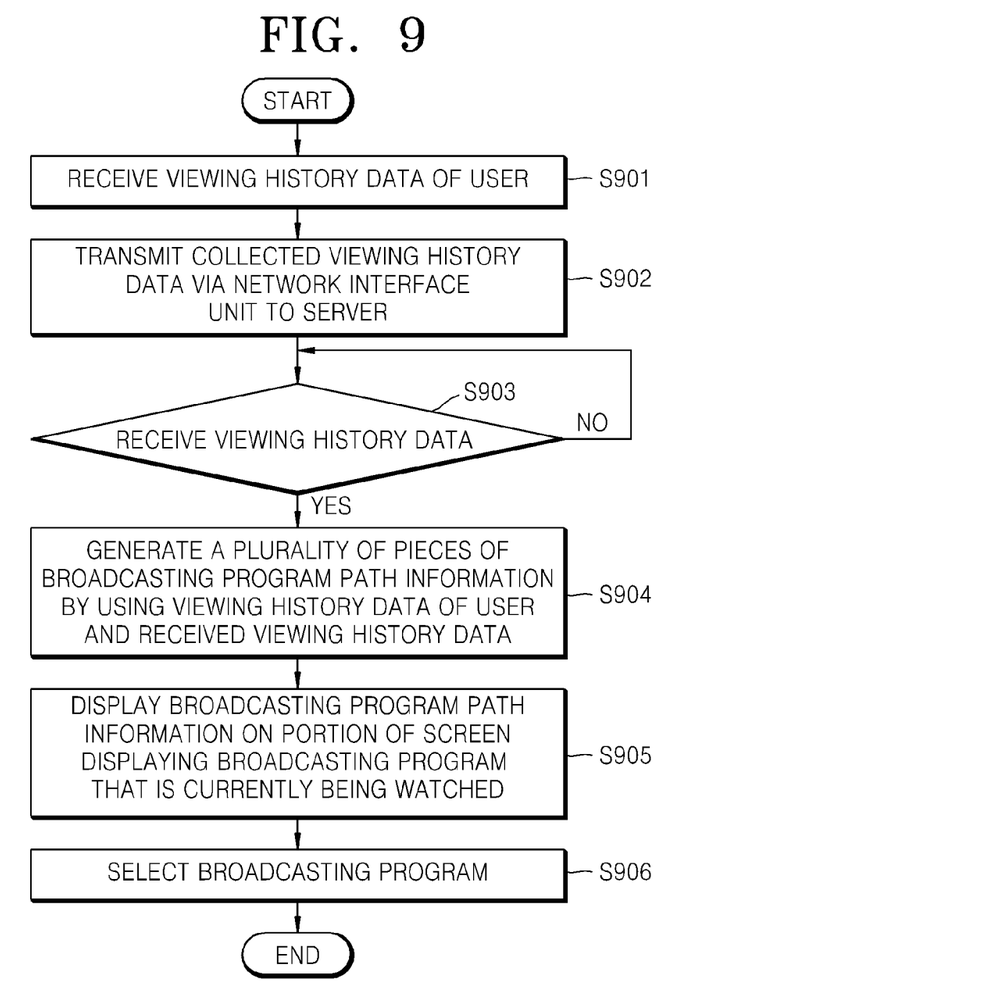
FIG. 9 is a flowchart illustrating a broadcasting program selection method performed by the broadcast receiver, according to another embodiment of the present invention.

Also, the processor 620 may operate in a manner as shown in FIG. 9. FIG. 9 is a flowchart illustrating a broadcasting program selection method performed by the broadcast receiver 600, according to another embodiment of the present invention.

Steps S901 and S904 of the flowchart of FIG. 9 are the same as steps S701 and S704 of the flowchart of FIG. 7, and thus, detailed descriptions thereof will be omitted here.

Figure 10:
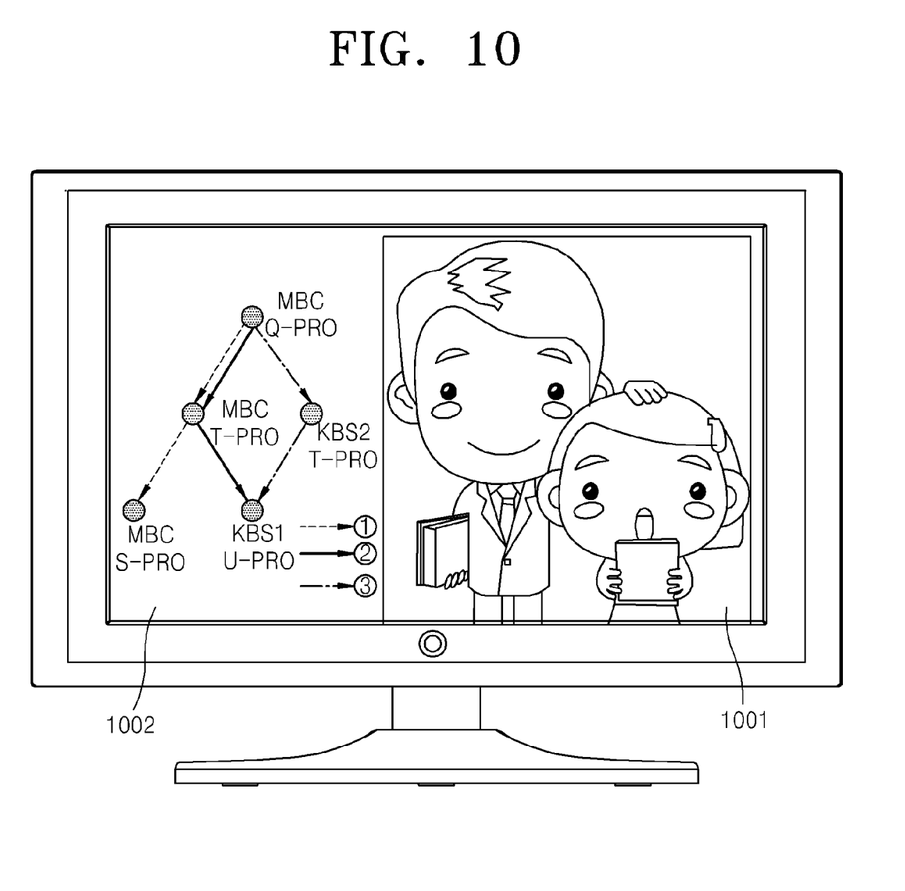
FIG. 10 illustrates an example in which a plurality of pieces of broadcasting program path information are displayed on a portion of a screen displaying a broadcasting program currently being watched.

In step S905, the processor 620 displays a plurality of pieces of broadcasting program path information on a portion of a screen displaying a broadcasting program that is being currently watched by a user. That is, as illustrated in FIG. 10, a portion of a screen 1001, displaying a broadcasting program currently being watched is allocated as a portion 1002 for a plurality of pieces of broadcasting program path information, and the plurality of pieces of broadcasting program path information are displayed on the portion 1002. FIG. 10 illustrates an example in which a plurality of pieces of broadcasting program path information are displayed on a portion of a screen displaying a broadcasting program currently being watched. When data selected from among the displayed plurality of pieces of broadcasting program path information is input by the input unit 610, in step S906, the processor 620 selects a broadcasting program according to the selected data. In the example of FIG. 10, the selected data is automatic reservation data. Thus, the processor 620 sequentially selects broadcasting programs according to the selected automatic reservation data.

Similar to the storage unit 120 of FIG. 1, the storage unit 630 of FIG. 6 stores viewing history data for each user, and stores the viewing history data received via the network interface unit 660. In particular, the storage unit 630 may store rating value information regarding ratings of broadcasting programs.

Similar to the display unit 130 of FIG. 1, the display unit 640 displays a received broadcast signal and broadcasting program path information. The displayed broadcasting program path information may be referred to as broadcasting program recommendation information based on the viewing history data of the user.

The broadcast signal receiving unit 650 may receive a digital broadcast signal or an analog broadcast signal. In the case in which the broadcast signal receiving unit 650 receives the digital broadcast signal, EPG data may be included in the received digital broadcast signal. In the case in which the broadcast signal receiving unit 650 receives the analog broadcast signal, EPG data may be received via another channel. The broadcast signal receiving unit 650 may have a function of decoding a received broadcast signal.

The network interface unit 660 may transmit and receive data via a network. In particular, according to the present embodiment, the viewing history data of the user may be transmitted from the broadcast receiver 600 to a server (not shown), and viewing history data received from the server is input to the processor 620. The network interface unit 660 may directly transmit the received viewing history data to the storage unit 630. The processor 620 generates broadcasting program path information according to the above-described manner by using the received viewing history data stored in the storage unit 630.

Figure 11:
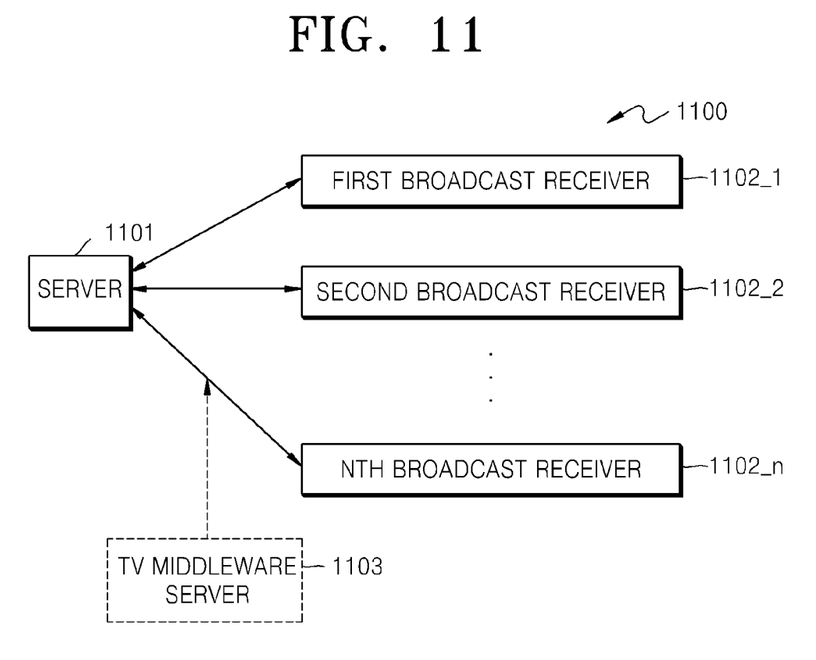
FIG. 11 illustrates a network configuration between a server and a broadcast receiver shown in FIG. 1 or 6.

FIG. 11 illustrates a network configuration 1100 between a server 1101 and a broadcast receiver shown in FIGS. 1 and 6.

The server 1101 of FIG. 11 manages the viewing history data. When viewing history data for each of a plurality of users is received from at least one broadcast receiver from among the first through $n_{th}$ broadcast receivers 1102_1 through 1102_$n$, the server 1101 analyzes the viewing history data for each user and detects a viewing preference of each user. That is, the server 1101 analyzes the viewing history data according to a received ID of each user, and detects the viewing preference of each user. Since the viewing history data includes data included in EPG data, the number of viewing counts, and a total viewing time periods, the server 1101 may detect the viewing preference of each user according to the viewing history data.

The server 1101 collects viewing history data of at least one group of people having a similar viewing preference to the user according to the detected viewing preference. The server 1101 then transmits the collected viewing history data of the group to the at least one broadcast receiver that has transmitted the viewing history data for each user. For example, in the case in which the broadcast receiver 1102_1 has transmitted the viewing history data for each user, the server 1101 transmits the collected viewing history data to the broadcast receiver 1102_1.

Further, the server 1101 collects viewing history data of other people according to a program rating at a same time slot based on the viewing history data for each user. The collected viewing history data indicates the viewing history data according to the program rating, which has already been described in relation to FIG. 8. The collecting step by the server 1101 may be performed by using data obtained according to viewing history data for each user, which is provided from each of the first through $n_{th}$ broadcast receivers 1102_1 through 1102_$n$.

The server 1101 transmits the collected viewing history data to the at least one broadcast receiver that has transmitted the viewing history data for each user. The at least one broadcast receiver receives the collected viewing history data, and generates and displays a plurality of pieces of broadcasting program path information according to the viewing history data for each user and the collected viewing history data, as described in FIG. 7 or 9.

A TV middleware server 1103 may exist between the server 1101 and the first through $n_{th}$ broadcast receivers 1102_1 through 1102_n. If the TV middleware server 1103 exists between the server 1101 and the first through $n_{th}$ broadcast receivers 1102_1 through 1102_n, detailed information regarding a broadcasting program may be further added to viewing history data that is transmitted from the server 1101 to the first through $n_{th}$ broadcast receivers 1102_1 through 1102_n. For example, the viewing history data includes information regarding a broadcasting program titled "A-PRO" broadcast at 17:00-18:00 every Monday by KBS1, the TV middleware server 1103 may add detailed casting information regarding the broadcasting program titled "A-PRO", program location information, program props information or the like to the viewing history data and then may transmit the viewing history data to a corresponding broadcast receiver.

The invention can also be embodied as computer readable codes on a computer readable recording medium. The computer readable recording medium is any data storage device that can store data which can thereafter be read by a computer system. Examples of the computer readable recording medium include Read-Only Memory (ROM), Random-Access Memory (RAM), CD-ROMs, magnetic tapes, floppy disks, optical data storage devices, and the like. The computer readable recording medium can also be distributed over network coupled computer systems so that the computer readable code is stored and executed in a distributed fashion.

While the present invention has been particularly shown and described with reference to embodiments thereof, it will be understood by those of ordinary skill in the art that various changes in form and details may be made therein without departing from the spirit and scope of the present invention as defined by the appended claims and their equivalents.

What is claimed is:

1. A broadcast receiver, comprising:
   a storage unit for storing viewing history data of a user;
   a display unit for displaying broadcasting program recommendation information, including at least one piece of broadcasting program path information indicating a graphical path of recommended programs overlaying received Electronic Program Guide (EPG) data, the recommended programs comprising a single respective recommended program at each of a plurality of time slots subsequent to a current time slot; and
   a processor for collecting the viewing history data by using the received EPG data, storing the viewing history data in the storage unit, generating the at least one piece of broadcasting program path information based on the viewing history data, displaying the at least one piece of broadcasting program path information on the display unit, and selecting a broadcasting program based on the at least one piece of broadcasting program path information.

2. The broadcast receiver of claim 1, wherein the at least one piece of broadcasting program path information contains information about a broadcasting program to be watched or recorded.

3. The broadcast receiver of claim 2, wherein the storage unit stores viewing history data for each of a plurality of users.

4. The broadcast receiver of claim 2, wherein, when automatic reservation data about the at least one piece of broadcasting program path information is received, the processor sequentially selects broadcasting programs according to the at least one piece of broadcasting program path information.

5. The broadcast receiver of claim 1, wherein the processor determines a user preferred broadcasting program by analyzing the viewing history data, and generates the at least one piece of broadcasting program path information based on the user preferred broadcasting program.

6. The broadcast receiver of claim 5, further comprising:
   a network interface unit for transmitting and receiving data via a network,
   wherein the processor generates a plurality of pieces of broadcasting program path information based on viewing history data collected by the network interface unit and the viewing history data of the user, and the viewing history data collected by the network interface unit is based on the viewing history data of the user.

7. The broadcast receiver of claim 6, wherein the viewing history data collected by the network interface unit comprises:
   viewing history data of at least one group determined by the viewing history data of the user, or viewing history data according to a program rating.

8. The broadcast receiver of claim 7, wherein the at least one group determined by the viewing history data of the user is a group having a similar broadcasting program preference to the user.

9. The broadcast receiver of claim 8, wherein the processor displays the plurality of pieces of broadcasting program path information on a portion of a screen displaying a broadcasting program that is currently being watched by the user.

10. A broadcasting program selection method comprising:
    collecting, at a processor of a broadcast receiver, viewing history data of a user by using received Electronic Program Guide (EPG) data;
    generating, at the processor of the broadcast receiver, at least one piece of broadcasting program path information based on the viewing history data, wherein the at least one piece of broadcasting program path information indicates a graphical path of recommended programs overlaying the received EPG data, the recommended programs comprising a single respective recommended program at each of a plurality of time slots subsequent to a current time slot;
    displaying, at a display unit of the broadcast receiver, the at least one piece of broadcasting program path information as broadcasting program recommendation information; and
    selecting, at the processor of the broadcast receiver, a broadcasting program based on the at least one piece of broadcasting program path information.

11. The broadcasting program selection method of claim 10, wherein the at least one piece of broadcasting program path information contains information about a broadcasting program to be watched or recorded.

12. The broadcasting program selection method of claim 11, wherein collecting the viewing history data comprises:
    collecting viewing history data for each of a plurality of users.

13. The broadcasting program selection method of claim 11, wherein selecting the broadcasting program comprises:
    when automatic reservation data about the at least one piece of broadcasting program path information is received, sequentially selecting broadcasting programs according to the at least one piece of broadcasting program path information.

14. The broadcasting program selection method of claim 10, wherein generating the at least one piece of broadcasting program path information comprises:
- determining a user preferred broadcasting program by analyzing the viewing history data; and
- generating the at least one piece of broadcasting program path information based on the user preferred broadcasting program.

15. The broadcasting program selection method of claim 14, wherein selecting the broadcasting program further comprises:
- collecting viewing history data via a network,
- wherein the generating of the at least one piece of broadcasting program path information further comprises:
- generating a plurality of pieces of broadcasting program path information based on viewing history data collected via the network and the viewing history data of the user, and the viewing history data collected via the network is based on the viewing history data of the user.

16. The broadcasting program selection method of claim 15, wherein the viewing history data collected via the network comprises viewing history data of at least one group determined by the viewing history data of the user, or viewing history data according to a program rating,
- wherein the at least one group is a group having a similar broadcasting program preference to the user.

17. The broadcasting program selection method of claim 16, wherein displaying the at least one piece of broadcasting program path information comprises:
- displaying the at least one piece of broadcasting program path information on a portion of a screen displaying a broadcasting program that is currently being watched by the user.

18. A non-transitory computer readable recording medium having recorded thereon a computer program for executing a broadcasting program selection method, comprising:
- a first code segment for generating at least one piece of broadcasting program path information based on the viewing history data, wherein the at least one piece of broadcasting program path information indicating a graphical path of recommended programs overlaying received Electronic Program Guide (EPG) data, the recommended programs comprising a single respective recommended program at each of a plurality of time slots subsequent to a current time slot;
- a second code segment for displaying the at least one piece of broadcasting program path information as broadcasting program recommendation information; and
- a third code segment for selecting a broadcasting program based on the at least one piece of broadcasting program path information.

* * * * *